(12) United States Patent
Anderson et al.

(10) Patent No.: US 7,599,431 B1
(45) Date of Patent: Oct. 6, 2009

(54) COMBINED DECISION FEEDBACK EQUALIZATION AND LINEAR EQUALIZATION

(75) Inventors: Stephen D. Anderson, Minnetonka, MN (US); Michael A. Nix, Buda, TX (US); Brian T. Brunn, Austin, TX (US); Jinghui Lu, Austin, TX (US); David E. Tetzlaff, Minnetonka, MN (US)

(73) Assignee: Xilinx, Inc., San Jose, CA (US)

( * ) Notice: Subject to any disclaimer, the term of this patent is extended or adjusted under 35 U.S.C. 154(b) by 890 days.

(21) Appl. No.: 10/997,159

(22) Filed: Nov. 24, 2004

(51) Int. Cl.
   *H03H 7/30* (2006.01)
(52) U.S. Cl. .................... 375/229; 375/233
(58) Field of Classification Search .............. 375/232, 375/233, 235, 257, 296, 219, 229, 135, 136, 375/146, 147, 260, 285, 346, 350, 230; 333/18, 333/28 R; 708/271, 300, 319, 322, 323, 708/425
   See application file for complete search history.

(56) References Cited

U.S. PATENT DOCUMENTS

| | | | | |
|---|---|---|---|---|
| 4,476,491 A | * | 10/1984 | Murata et al. | 348/614 |
| 4,760,602 A | * | 7/1988 | Gibson et al. | 381/106 |
| 4,872,184 A | * | 10/1989 | Yamaguchi et al. | 375/232 |
| 5,353,306 A | * | 10/1994 | Yamamoto | 375/233 |
| 5,361,400 A | * | 11/1994 | Kazecki et al. | 455/63.1 |
| 5,594,756 A | * | 1/1997 | Sakurai et al. | 375/233 |
| 5,661,753 A | * | 8/1997 | Iemura | 375/233 |
| 5,748,674 A | * | 5/1998 | Lim | 375/233 |
| 5,751,769 A | * | 5/1998 | Pressey et al. | 375/235 |
| 5,777,692 A | * | 7/1998 | Ghosh | 348/725 |
| 6,012,161 A | * | 1/2000 | Ariyavisitakul et al. | 714/795 |
| 6,047,032 A | * | 4/2000 | Zortea et al. | 375/317 |
| 6,327,302 B1 | * | 12/2001 | Shen | 375/232 |

(Continued)

FOREIGN PATENT DOCUMENTS

WO    WO 98/48545    * 10/1998

OTHER PUBLICATIONS

Hoyos et al., Mixed-Signal Equalization Architectures For Printed Circuit Board Channels, Feb. 2004, Circuits and Systems 1: Regular Papers, IEEE Transactions on [Circuits and Systems 1: Fundamental Theoey and Applications, IEEE Transactions on], vol. 51, Issue 2, pp. 264-274.*

(Continued)

*Primary Examiner*—Tesfaldet Bocure
*Assistant Examiner*—Lawrence B Williams
(74) *Attorney, Agent, or Firm*—Timothy W. Markison; Kin-Wah Tong

(57) ABSTRACT

A communication system includes a transmitter, a communication channel, and a receiver. The transmitter includes a pre-emphasis module, a summing module, a line driver, and a decision feedback pre-emphasis (DFP) module to produce a pre-emphasized serial stream of data based on a communications channel response and an inter-symbol interference level. The receiver includes a linear equalizer, a summing module, a decision module, and a decision feedback equalization (DFE) module. The linear equalizer produces an equalized serial stream of data. The summing module sums at least one data element of the equalized serial stream of data with DFE data elements to produce equalized data elements. The decision module interprets the equalized data elements to produce interpreted data elements to DFE module, which produces the DFE data elements from the interpreted data elements.

26 Claims, 6 Drawing Sheets

U.S. PATENT DOCUMENTS

| | | | |
|---|---|---|---|
| 6,366,613 B2* | 4/2002 | Sommer et al. | 375/232 |
| 6,519,010 B2* | 2/2003 | Twitchell et al. | 348/608 |
| 6,704,365 B2* | 3/2004 | Haycock | 375/257 |
| 6,751,255 B1* | 6/2004 | Reuven et al. | 375/233 |
| 7,184,478 B2* | 2/2007 | Popescu et al. | 375/233 |
| 7,319,705 B1* | 1/2008 | Wu et al. | 370/534 |
| 2002/0044598 A1* | 4/2002 | Frenkel et al. | 375/232 |
| 2003/0035495 A1* | 2/2003 | Laamanen et al. | 375/296 |
| 2003/0081669 A1* | 5/2003 | Yousef et al. | 375/233 |
| 2004/0057513 A1* | 3/2004 | Schenk | 375/233 |
| 2005/0254569 A1* | 11/2005 | Momtaz | 375/233 |

OTHER PUBLICATIONS

U.S. Appl. No. 10/900,945, filed Jul. 28, 2004, Brunn et al.

Tycol Electronics; "H19-Reliable Serial Backplane Data Transmission at 10 Gb/s," DesignCon 2002, Jan. 30, 2002, pp. 1-27 Available at http://www.amp.com/prodnews.asp?id=282.

Lazaris-Brunner, et al., "Reliable Serial Backplane Data Transmission at 10 Gb/s", DesignCon 2002, High Performance System Design Conference, Jan. 30, 2002, 15 pages.

* cited by examiner receiver section 30 or 40 transmitter 32 or 38

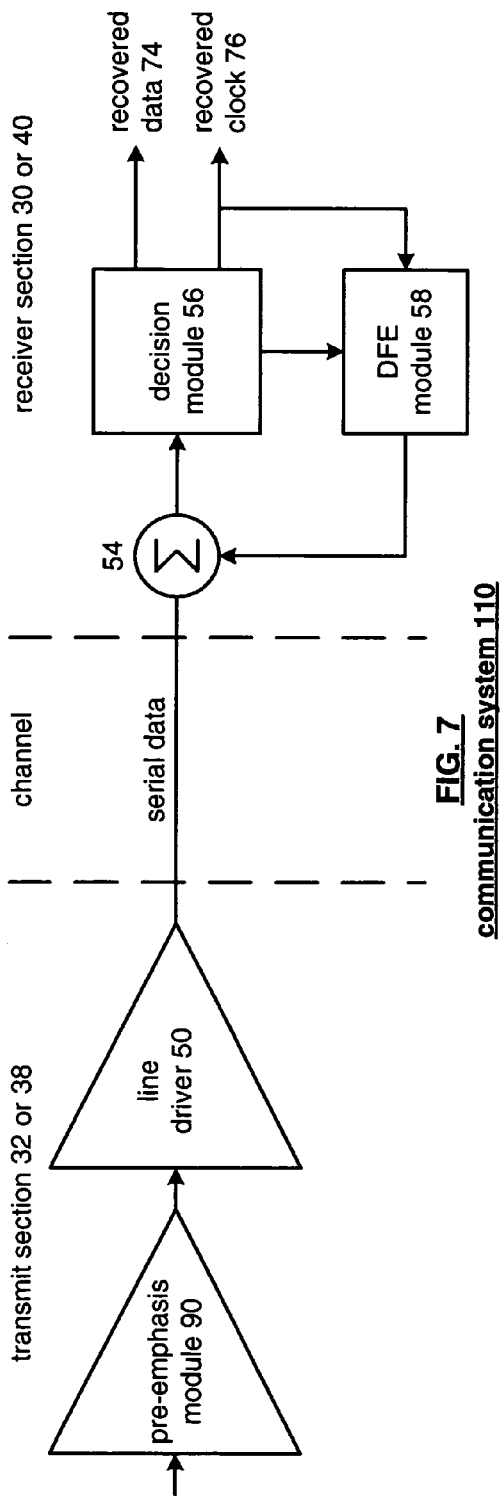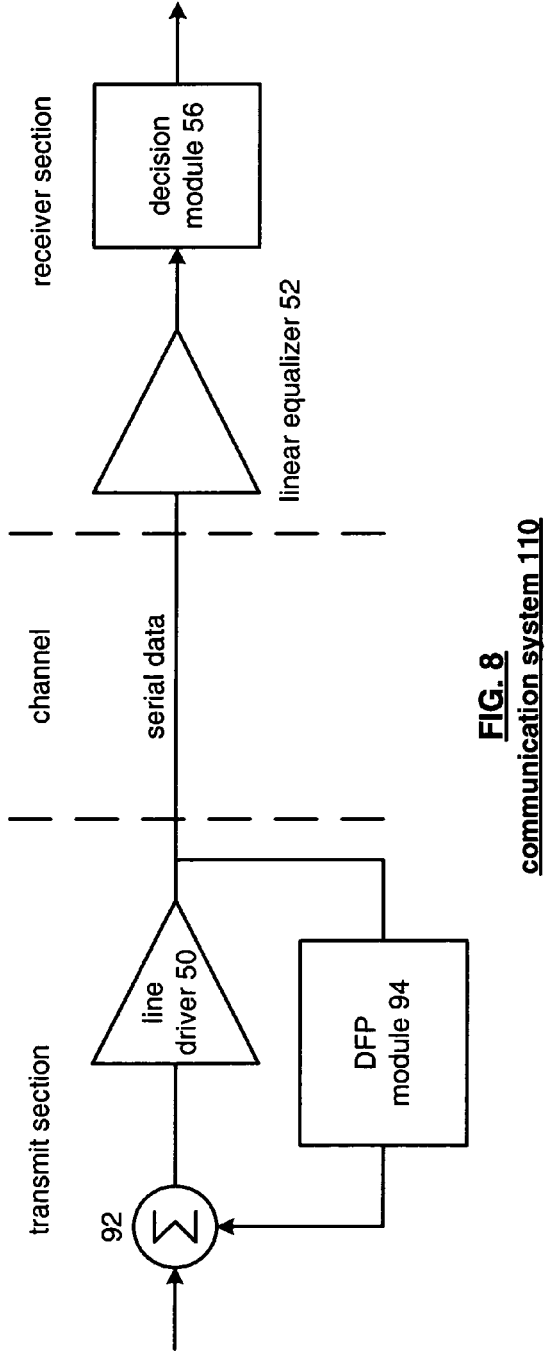

COMBINED DECISION FEEDBACK EQUALIZATION AND LINEAR EQUALIZATION

FIELD OF THE INVENTION

This invention relates generally to data communications and more particularly to data communication signaling.

BACKGROUND OF THE INVENTION

Description of Related Art

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that includes many data rates above and below 10 gigabits per second, i.e. OC-48, OC-192, OC-768. In accordance with such standards, many system components and end user devices of a communication system transport data via serial transmission paths. Internally, however, the system components and end user devices process data in a parallel manner. As such, each system component and end user device must receive the serial data and convert the serial data into parallel data without loss of information.

Accurate recovery of information from high-speed serial transmissions typically requires transceiver components to operate at clock rates that are half of, equal to or higher than the rate of the received serial data, which, for today's high-speed systems, requires very high clock rates. At such high data rates, printed circuit traces and copper cabling introduce frequency-dependent attenuation in the form of skin effect and dielectric absorption. This attenuation subjects the transmitted signal to inter-symbol interference. The received signal may be severely distorted so that accurate recovery of data becomes difficult or impossible.

Therefore, a need exists for equalization circuitry that operates at high speeds and may be implemented using today's IC fabrication techniques and corrects the above-mentioned limitations.

BRIEF SUMMARY OF THE INVENTION

A linear communications system with decision feedback pre-emphasis, linear equalization, and decision feedback equalization substantially meets these needs and others. In one embodiment, a high speed serial receiver includes a linear equalizer, a summing module, a decision module, and a decision feedback equalization module. The linear equalizer is operably coupled to equalize a serial stream of data to produce an equalized serial stream of data. The summing module is operably coupled to sum at least one data element of the equalized serial stream of data with decision feedback equalization (DFE) data elements to produce equalized data elements. The decision module is operably coupled to interpret the equalized data elements to produce interpreted data elements. The decision feedback equalization (DFE) module is operably coupled to produce the DFE data elements from the interpreted data elements.

In another embodiment, a transmitter includes a pre-emphasis module, a summing module, a line driver, and a decision feedback pre-emphasis module. The pre-emphasis module is operably coupled to pre-emphasize a serial stream of data to produce a pre-emphasized serial stream of data. The summing module is operably coupled to sum at least one data element of the pre-emphasized serial stream of data with decision feedback pre-emphasis (DFP) data elements to produce pre-emphasized data elements. The line driver is operably coupled to drive the pre-emphasized data elements on to a channel. The decision feedback pre-emphasis (DFP) module is operably coupled to produce the DFP data elements based on at least one of data elements of the serial stream of data and the pre-emphasized data elements.

In yet another embodiment, a communication system includes a communication channel, a pre-emphasis module of a transmitter, a line driver of the transmitter, a summing module of a receiver, a decision module of the receiver, and a decision feedback equalization (DFE) module of the receiver. The communication channel is operably coupled to transport transmitted serial data from the transmitter of a first data conveyance module to the receiver of a second data conveyance module. The pre-emphasis module of the transmitter is operably coupled to pre-emphasize a serial stream of data to produce a pre-emphasized serial stream of data. The line driver of the transmitter is operably coupled to drive the pre-emphasized serial data on to the communication channel as the transmitted serial data. The summing module of the receiver is operably coupled to sum at least one data element of the transmitted serial data with decision feedback equalization (DFE) data elements to produce equalized data elements. The decision module of the receiver is operably coupled to interpret the equalized data elements to produce interpreted data elements. The decision feedback equalization (DFE) module of the receiver is operably coupled to produce the DFE data elements from the interpreted data elements.

BRIEF DESCRIPTION OF THE SEVERAL VIEWS OF THE DRAWINGS

FIG. 7 is a functional block diagram of a linear communications system in accordance with the present invention; and FIG. 8 is a functional block diagram of a linear communications system according to an alternate embodiment of the present invention.

DETAILED DESCRIPTION OF THE INVENTION

Figure 1:
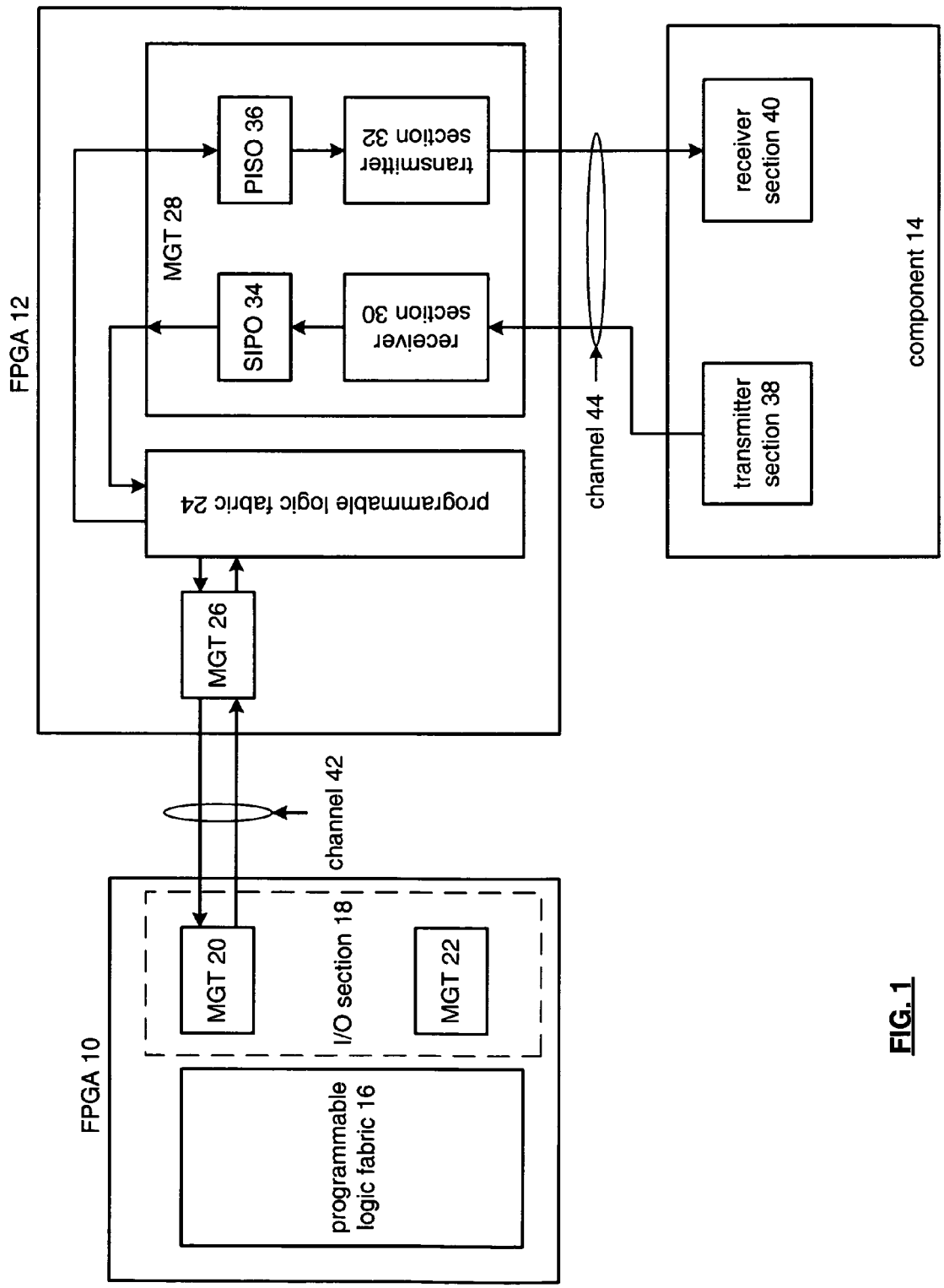
FIG. 1 is a functional block diagram of a communications system in accordance with the present invention.

FIG. 1 is a functional block diagram of a linear communications system that includes a field programmable gate array (FPGA) 10, FPGA 12, and a component 14. FPGA 10 includes programmable logic fabric 16, a multi-gigabit transceiver (MGT) 20, MGT 22, and an input/output (I/O) section 18. FPGA 12 includes MGT 26, programmable logic fabric 24, and MGT 28. MGT 28 includes a parallel input-serial output (PISO) module 36, a transmitter section 32, a receiver section 30, and a serial-in-parallel-out (SIPO) module 34. Component 14 includes transmitter section 38 and receiver section 40. Note that while some embodiments described herein may relate to programmable logic devices such as FPGAs, other embodiments may include other types of devices or integrated circuits. In particular, in some embodiments, one or both of FPGA 10 and FPGA 12 may be another component including an MGT.

Programmable logic fabric 16 may be implemented as a symmetric array configuration, a row-based configuration, a sea-of-gates configuration, and/or a hierarchical programmable logic device configuration. Programmable logic fabric 16 may further include at least one dedicated fixed processor, such as a microprocessor core, to further facilitate the programmable flexibility of the each multi-gigabit transceivers, for example MGT 20 and MGT 22. In other embodiments, the programmable logic fabric may include other resources such as multipliers, digital signal processors, or memory.

In general, each MGT performs a serial-to-parallel conversion on receive data and performs a parallel-to-serial conversion on transmit data. The parallel interface may be any width and need not be on byte boundaries. The programmable logic fabric generates control signals to program the transceiver in each MGT for a desired transmission rate to conform to the transmission standard. Additionally, the transmitter section and receiver section in each MGT may be programmed to support separate transmission standards.

As can be seen, MGT 20 is operably coupled to MGT 26 over a channel 42. The channel, in the described embodiment, is a wired connection and may represent a copper circuit trace or a copper cable. At high data rates, the wired connection acts like a transmission line, exhibits frequency dependent attenuation and phase distortion and may introduce signal reflections due to discontinuities at the connections points or a mismatch in termination impedance.

Programmable logic fabric 24 sends control signals to MGT 26 and MGT 28 to define the serialization and de-serialization settings for each parallel-in-serial-out (PISO) module and serial-in-parallel-out (SIPO) module, respectively, in the FPGA. Specifically, SIPO 34 and PISO 36 receive the serialization and de-serialization settings to define the communications for receiver section 30 and transmitter section 32. Transmitter section 32 is operably coupled to transmit serial data over channel 44 to component 14, while receiver section 30 is operably coupled to receive serial data from a transmitter section 38 of component 14. The transmitter section 38 and a receiver section 40 of component 14 may be part of a MGT, an application specific integrated circuit (ASIC) transceiver, or other device including a dedicated transceiver.

The wired connections of channels 42 and 44 may introduce distortion into the serial transmissions in addition to the transmission line effects previous discussed. Data rates in excess of 1 Gbps tend to experience a loss in high frequency components due to the skin effect and dielectric absorption. This loss or attenuation introduces inter-symbol interference and jitter into the signal making the recovery of error free data almost impossible. Pre-emphasis in the transmitter section and equalization in the receiver are used to partially compensate for the distortion that contributes to inter-symbol interference. The method and apparatus of the described invention applies decision feedback pre-emphasis (DFP), linear equalization (LE), and decision feedback equalization (DFE) to substantially reduce inter-symbol interference.

Figure 2:
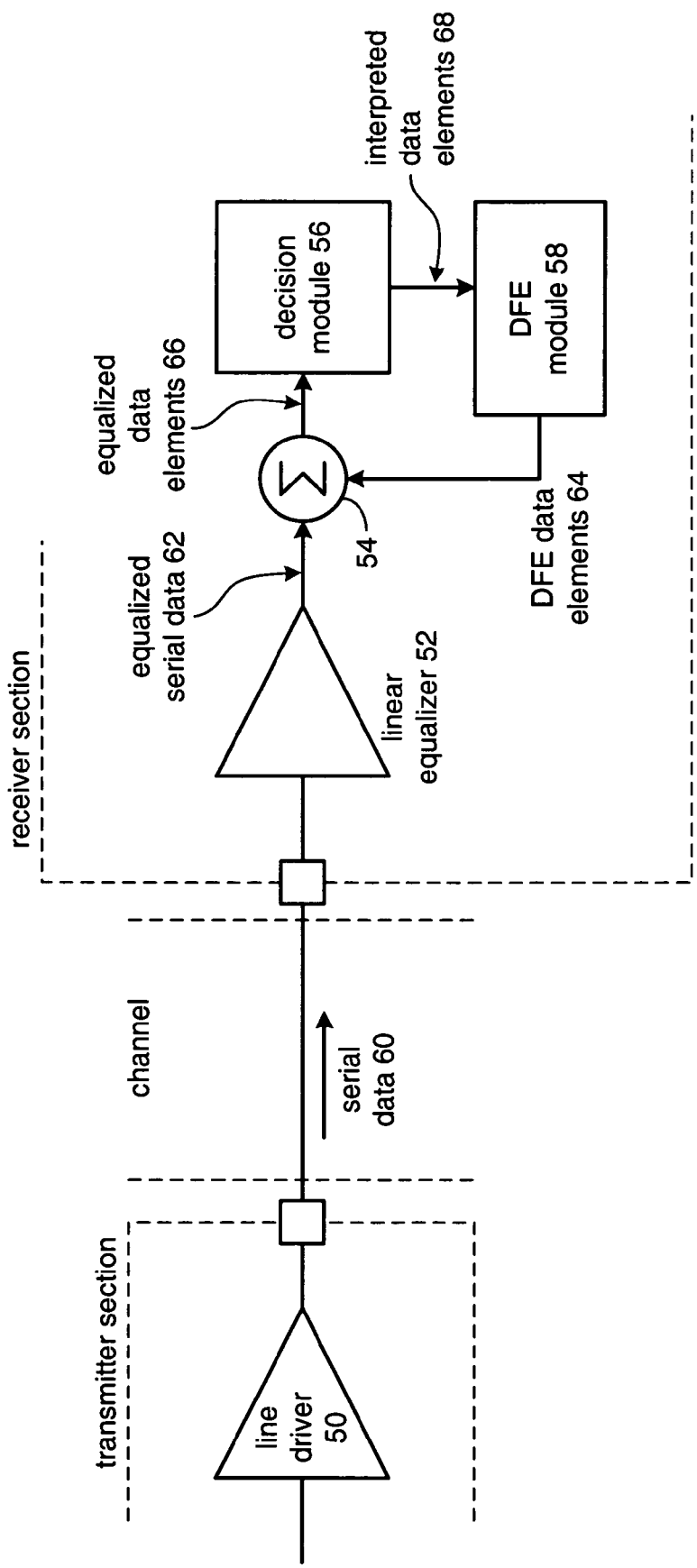
FIG. 2 is a functional block diagram of a transmitter section and a receiver section of a linear communications system.

FIG. 2 is a functional block diagram of a transmitter section and a receiver section of a linear communications system. A portion of the transmitter section includes a line driver 50 for driving serial data 60 onto a channel (channel 42 or channel 44 of FIG. 1) to a receiver section. The receiver section includes linear equalizer 52, a summing module 54, a decision module 56, and a decision feedback equalization (DFE) module 58.

In operation, linear equalizer 52 is operably coupled to equalize serial data 60 to produce an equalized serial data 62 to summing module 54. Linear equalizer 52 equalizes the serial data 60 at one of a plurality of equalization levels based on at least one of a channel response and an inter-symbol interference level. Summing module 54 is operably coupled to sum at least one data element of the equalized serial data 62 with DFE data elements 64 to produce equalized data elements 66. Decision module 56 is operably coupled to interpret the equalized data elements 66 to produce interpreted data elements 68 to DFE module 58. DFE module 58 is operably coupled to produce DFE data elements 64 from interpreted data element 68. One aspect of the present invention includes both linear equalizer 52 and DFE module 58 in the receiver section. In some embodiments, the DFE module operates at a frequency of at least approximately 3 GHz.

Figure 3:
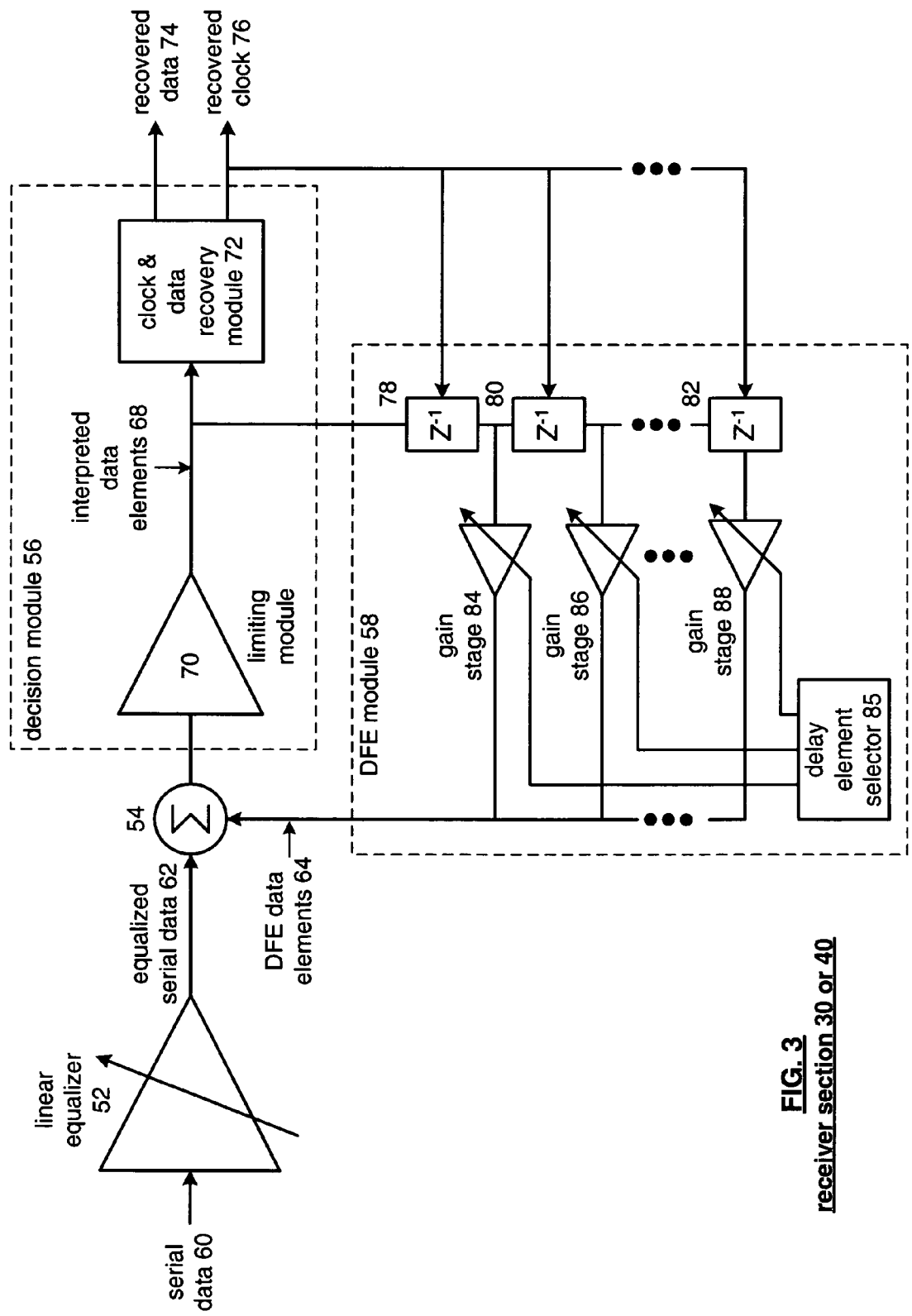
FIG. 3 is a functional block diagram of a receiver section in accordance with the present invention.

FIG. 3 is a functional block diagram of a receiver section that includes a linear equalizer 52, a summing module 54, a decision module 56, and a DFE module 58. Decision module 56 includes a limiting module 70 and a clock and data recovery module 72. DFE module 58 includes a plurality of delay stages 78-82, a plurality of gain stages 84-88, and a delay element selector 85.

In operation, the receiver section, such as receiver section 30 or 40 of FIG. 1, receives serial data 60 via a communication channel, for example, channel 42 or channel 44 of FIG. 1, and couples the serial data 60 to linear equalizer 52. As is known to one of average skill in the art, linear equalizers are designed to have a transfer function that is an approximate inverse of the channel response to substantially compensate for communication channel induced distortion. Generally, the communication channel functions as a low pass filter that attenuates the high frequency components of high-speed serial data 60 so linear equalizer 52 amplifies the high frequency components to substantially compensate for the attenuation of the communication channel. Linear equalizer 52 includes a programmable equalizer to equalize serial data 60 at one of a plurality of equalization levels based on the channel response. The equalizer further determines one of the plurality of equalization levels based on at least one of the channel response and inter-symbol interference (ISI) level.

Equalized serial data 62 is operably coupled to summing module 54 that is operably coupled to sum at least one data element of the equalized serial data 62 with DFE data elements 64 to produce equalized data elements to decision module 56. Limiting module 70 squares up the data to one of a logic one or a logic zero so the clock and data recovery module 72 can accurately produce recovered data 74 and recovered clock 76 from interpreted data elements 68. One embodiment of a limiting module is described in greater detail in a co-pending U.S. patent application Ser. No. 10/900,945, entitled "Limiting Circuit with Level Limited Feedback" by Brunn et al., filed on Jul. 24, 2004. DFE module 58 is operably coupled to receive interpreted data elements 68 and recovered clock 76 to produce delayed interpreted data elements to the plurality of gain stages. The plurality of gain stages is operably coupled to apply gain to a corresponding one of the plurality of delayed interpreted data elements to produce DFE data elements. In the embodiment shown in FIG. 3, each delay element has an equal delay, as provided by the delay element selector 85, and are coupled in a cascade configuration to produce a total delay through the plurality of delay stages.

In an alternate embodiment, each delay stage, namely delay stages 78, 80, and 82, is operably coupled to receive interpreted data elements 68. Each delay stage has an increasing amount of delay so that the total delay in this embodiment is substantially equal to the total delay through the cascade embodiment. Each gain stage of the plurality of gain stages is operably coupled to receive a gain adjustment from the delay element selector 85 based on the channel response wherein a gain not equal to zero selects the gain stage and a gain equal to zero effectively removes the gain stage from the DFE module.

As previously mentioned, linear equalizer 52 amplifies high frequency signals to compensate for the channel response. Linear equalizer 52 also amplifies any high frequency crosstalk and ripple in the equalizer bandwidth. One aspect of the present invention is to include a decision feedback equalizer as well as the linear equalizer in the same circuit to substantially remove the ripple from the equalized serial data without further amplifying the high frequency crosstalk.

Figure 4:
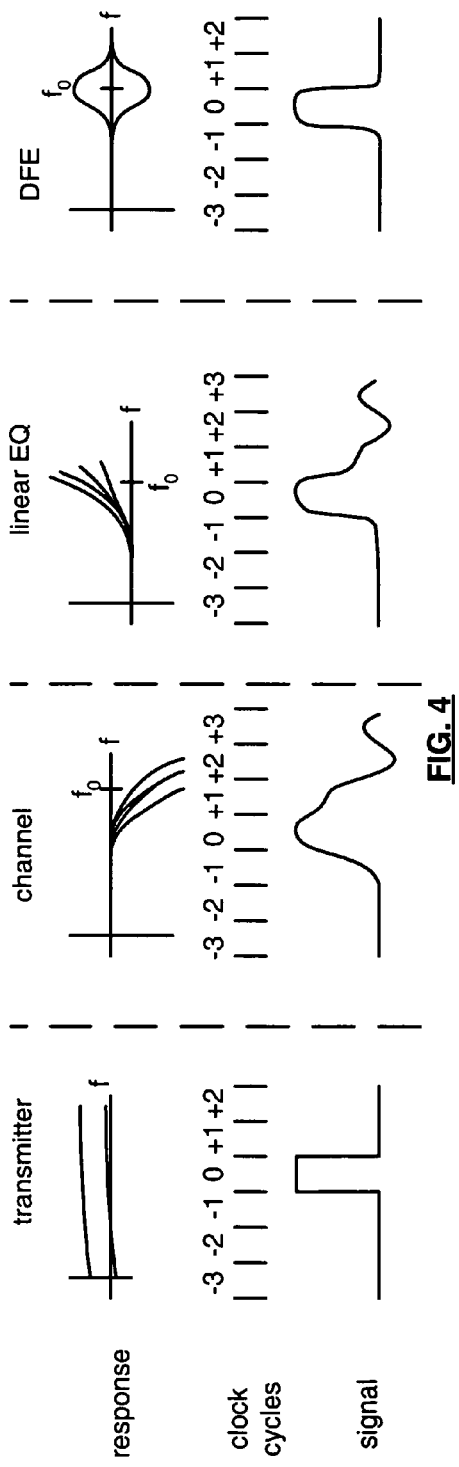
FIG. 4 is a series of graphs illustrating linear equalization and DFE equalization on a transmitted serial bit in accordance with the present invention.

FIG. 4 is a series of graphs illustrating linear equalization and DFE equalization on a transmitted signal in accordance with the present invention. The clock cycle scale time 0 represents the present while –1 represents the previous or past clock cycle and +1 represents the next or future clock cycle. The first graph illustrates a signal transmitted at time 0. The transmitter response is approximately linear throughout the bandwidth so the signal is not distorted by the transmitter. The second graph illustrates the channel response as a low pass function that attenuates the high frequency components of the signal. The distortion introduces spreading or smearing of the signal such that the signal energy spreads into adjacent clock cycles creating inter-symbol interference (ISI). Distortion from the previous signal during clock cycles –1, –2, and –3 introduces ISI into the present signal.

The third graph illustrates the effects of the linear equalizer on the distorted signal. The linear equalizer functions to produce a response that is the approximate inverse of the channel response to compensate for the channel induced distortion. As can be seen from the linear EQ response, the linear equalizer amplifies high frequency signals within the pass band of the equalizer. One limitation of the linear equalizer is that it amplifies all signals within its bandwidth including high frequency cross talk and ripple. The linear equalizer restores the signal's high frequency components but does not remove the high frequency cross talk and ripple.

The fourth graph illustrates the signal output from the summation of the linear equalizer output and the DFE data elements produced by the DFE module. The DFE module uses the values of previous signals to estimate ISI for subsequent signals. The DFE module adjusts the equalization of the present signal by the changing the gain settings for each of the plurality of gain stages. The ISI being removed was caused by the previous signal distortion spreading into the present signal. The DFE module feeds back the previous signals delayed by an integer number of clock cycles, adds gain with a programmable gain stage, if necessary, to appropriately weight the feed back signal, and subtracts the summation of all gain stages to produce the equalized data elements. As can be seen, the response from clock cycles –1, –2, and –3 has been subtracted from the present signal. The combination of linear equalization and DFE equalization substantially removes the effects of the channel response and ripple from the signal.

Figure 5:
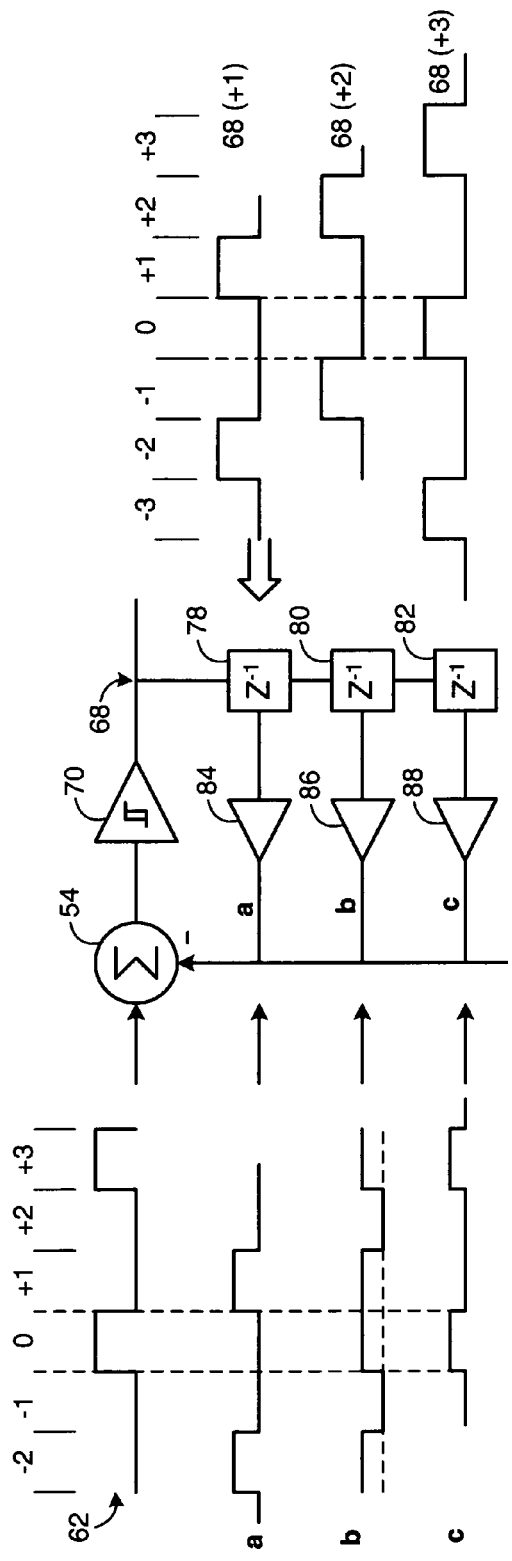
FIG. 5 is a functional block diagram of a DFE module illustrating generation of DFE data elements.

FIG. 5 is a functional block diagram of the DFE module illustrating generation of DFE data elements. The DFE module includes summing module 54, limiting module 70, delay elements 78-82, and gain stages 84-86. The generation of equalized data elements in the example of FIG. 5 represents the response of the DFE module to the linear equalized signal of FIG. 4. As mentioned previously, the DFE assumes that previous decisions are correct and, therefore, the present signal will incur approximately the same distortion as the previous signal. Corrections based on previous decisions can be applied to the present signal to substantially remove ISI.

Each delay element in FIG. 5 delays interpreted data element 68 by one clock cycle before coupling the delayed signal to the next delay stage. Thus equalized data element "c" represents a correction for distortion or smearing from the previous signal occurring at time –3, wherein –3 represents 3 clock cycles in the past and +3 represents 3 clock cycles in the future. Since data element "c" is delayed by 3 clock cycles, it is gained by gain stage 88 and subtracted from the present signal at time 0. Data element "a" represents a correction for distortion from the previous signal that has spread out 1 clock cycle from the previous signal. The previous signal produced a dip or attenuation in the smearing or distortion at the +2 clock cycle point so data element "b" must be gained to add to the signal thus the gain of data element "b" is negative as indicated by the dashed line and will be added to the signal at time +2.

Figure 6:
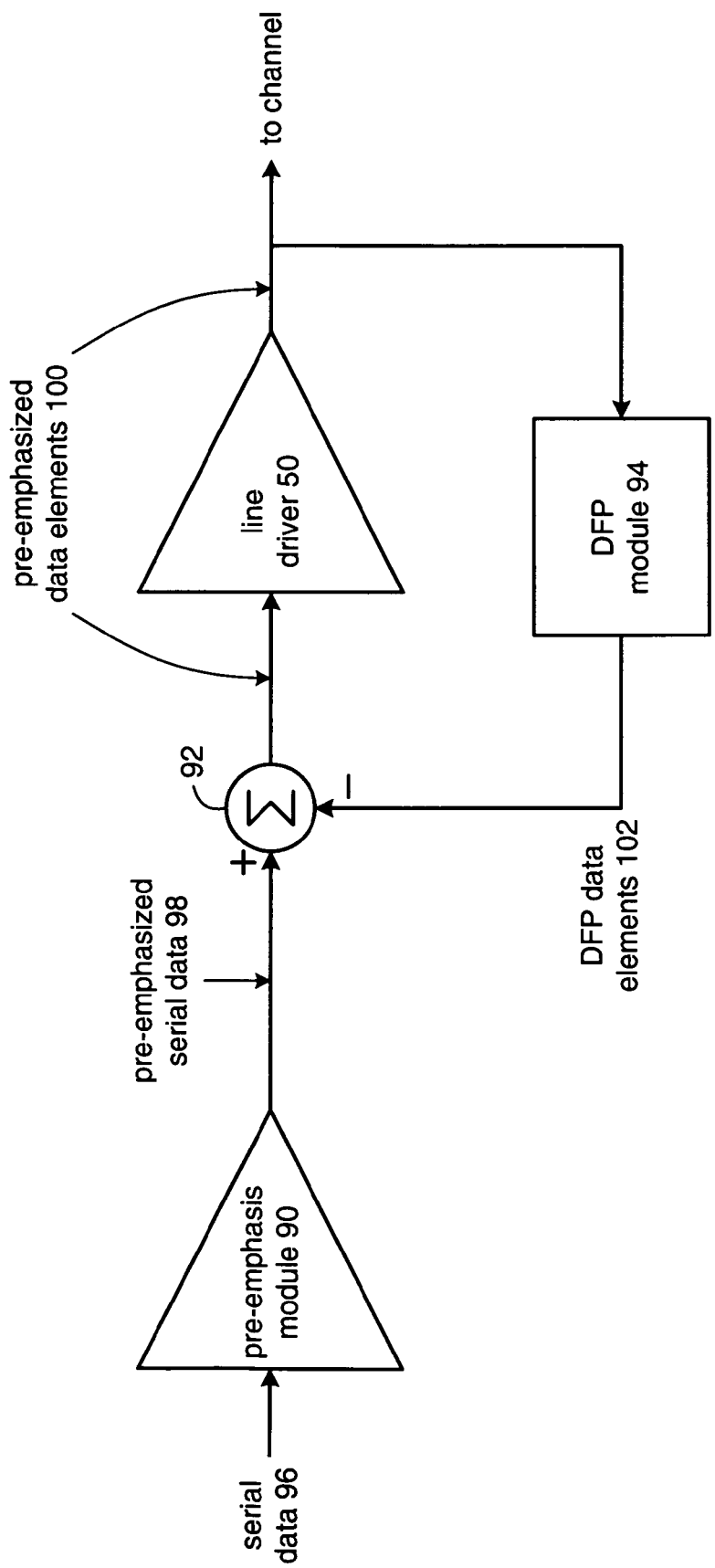
FIG. 6 is a functional block diagram of a transmitter in accordance with the present invention.

FIG. 6 is a functional block diagram of a transmitter that includes a pre-emphasis module 90, a summing module 92, a line driver 50, and a decision feedback pre-emphasis (DFP) module 94.

In operation, the transmitter, such as transmitter section 32 or transmitter section 38 of FIG. 1, functions to receive serial data 96 from a parallel-in-to-serial-out (PISO) module and to transmit the serial data onto a channel, such as channel 42 or channel 44 of FIG. 1. The transmitted serial data may be distorted by the channel due to multi-path fading in a wireless media or due to skin effect and dielectric absorption in wired media. Pre-emphasis added to the serial data prior to transmission partially compensates for expected distortion in the channel.

Pre-emphasis module 90 is operably coupled to receive serial data 96 and to produce pre-emphasized serial data 98 to summing module 92. Pre-emphasis module 90, as is known to one of average skill in the art, pre-emphasizes the serial data at one of a plurality of pre-emphasis levels based on one of a channel response and an inter-symbol interference level. Programmable pre-emphasis module 90 is configured to amplify a selected range of frequencies in the bandwidth of the transmitter based on one of an expected channel response and a channel response to a series of training pulses transmitted over the channel. In general, the pre-emphasis is an inverse function of the expected channel response. Summing module 92 sums the pre-emphasized serial data 98 with DFP data elements 102 to produce pre-emphasized data elements 100. Line driver 50 provides the power to drive the pre-emphasized data elements 100 onto the channel. Additionally, the pre-emphasized data elements 100 are operably coupled from line driver 50 to DFP module 94.

DFP module 94 includes a plurality of delay stages and a corresponding plurality of gain stages to produce DFP data elements 102. At least one of the plurality of gain stages is operably coupled to gain a corresponding one of the plurality of delayed data elements to produce the DFP data elements. A delay element selector is operably coupled to select the at least one of the plurality of gain stages to produce the DFP data elements based on a channel response. DFP module 94 is functionally equivalent to DFE module 58 as was described with respect to FIG. 3. In some embodiments, the DFP module operates at a frequency of at least approximately 3 GHz.

In an alternate embodiment of the transmitter, a decision feedforward pre-emphasis module is operably coupled to serial data 96 to produced decision feedforward pre-emphasized data elements to summing module 92.

FIG. 7 is a functional block diagram of communication system 110 that includes transmitter section 32 or 38, a channel, and a receiver section 30 or 40. The transmit section includes pre-emphasis module 90 and line driver 50. Receiver section 30 or 40 includes summing module 54, decision module 56, and DFE module 58.

In operation, the communication channel is operably coupled to transport transmitted serial data from transmitter section 32 or 38 of a first data conveyance module to receiver 30 or 40 of a second data conveyance module. The conveyance module, as it applies to communication system 110, represents any high-speed device capable of transmitting and receiving high-speed serial data, such as a multi-gigabit transceiver (MGT), high-speed application specific integrated circuit (ASIC), or other dedicated high-speed integrated circuit. The communication system determines one of a plurality of pre-emphasis levels based on at least one of the channel response and an inter-symbol interference level and determines the gain of the at least one of the plurality of gain stages based on at least one of the channel response and an inter-symbol interference level. The pre-emphasis module 90, operable as a programmable pre-emphasis module, produces pre-emphasized serial data 98 as a serial stream of data to line driver 50 of the transmitter, wherein the line driver is operably coupled to drive the pre-emphasized serial data on to the channel.

Summing module 54 is operably coupled to sum at least one data element of the transmitted serial data with DFE data elements to produce equalized data elements. Decision module 56 is operably coupled to interpret the equalized data elements to produce interpreted data elements. Decision module 56 includes a limiting module operably coupled to limit the transmitted serial data to produce a limited serial data and a clock and data recovery module operably coupled to produce recovered clock 76 and recovered data 74 based on the limited serial data.

DFE module 58 is operably coupled to produce the DFE data elements from the interpreted data elements including a recovered clock 76 or a clock based on the transmit clock. DFE module 58 includes a plurality of delay elements operably coupled to delay the interpreted data elements to produce a plurality of delayed interpreted data elements, and a plurality of gain stages, wherein at least one of the plurality of gain stages is operably coupled to gain a corresponding one of the plurality of delayed interpreted data elements to produce the DFE data elements. The DFE module further includes a delay element selector operably coupled to select the at least one of the plurality of gain stages to produce the DFE data elements based on the channel response. The DFE module functions to selectively adjust gain of at least one of the plurality of gain stages based on a channel response.

FIG. 8 is a functional block diagram of a linear communication system according to an alternate embodiment of the present invention. Communication system 110 includes a transmit section, a communication channel, and a receiver section. The transmit section includes summing module 92, line driver 50, and decision DFP module 94. The receiver section includes linear equalizer 52 and decision module 56.

The communication channel is operably coupled to transport transmitted serial data from a transmitter of a first data conveyance module to a receiver of a second data conveyance module. In the context of the communication system 110, the data conveyance module represents any high-speed device capable of transmitting and receiving high-speed serial data, such as a multi-gigabit transceiver (MGT), a high-speed application specific integrated circuit (ASIC), or dedicated high-speed integrated circuit. Summing module 92 is operably coupled to sum at least one data element of a serial data stream with DFP data elements to produce pre-emphasized data elements. The pre-emphasized data elements are operably coupled to line driver 50 which drives the pre-emphasized data elements on to the communication channel as the transmitted serial data. The pre-emphasized data elements are also operably coupled to DFP module 94 to produce the DFP data elements based on at least one of data elements of the serial data and the pre-emphasized data elements.

DFP module 94 includes a plurality of delay elements, a plurality of gain stages, and a delay element selector. The plurality of delay elements are operably coupled to receive a clock based on a transmit clock and are further coupled to delay the at least one of the data elements of the serial data and the pre-emphasized data elements to produce delayed data elements. At least one of the plurality of gain stages is operably coupled to gain a corresponding one of the plurality of delayed data elements to produce the DFP data elements. Each of the plurality of delay elements is operably coupled to receive a clock based on the transmit clock. The delay element selector of the DFP module is operably coupled to select and adjust the at least one of the plurality of gain stages to produce the DFP data elements based on at least one of a channel response and an inter-symbol interference level.

The linear equalizer of the receiver section is programmable and is operably coupled to equalize the transmitted serial data at one of a plurality of equalization levels based on the channel response to produce the equalized serial data. The programmable linear equalizer selects the one of a plurality of equalization levels based on at least one of the channel response and an inter-symbol interference level. The decision module, operably coupled to receive the equalized serial data, interprets the equalized serial data to produce interpreted serial data.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented an apparatus for combining decision feedback equalization with linear equalization in a high-speed integrated circuit. As one of average skill in the art will appreciate, other embodiments may be derived from the teachings of the present invention without deviating from the scope of the claims.

What is claimed is:

1. A high speed serial receiver comprising:
    a linear equalizer operably coupled to equalize a serial stream of data to produce an equalized serial stream of data;
    a summing module operably coupled to sum at least one data element of the equalized serial stream of data with decision feedback equalization (DFE) data elements to produce equalized data elements;
    a decision module operably coupled to interpret the equalized data elements to produce interpreted data elements; and
    a decision feedback equalization (DFE) module operably coupled to produce the DFE data elements from the interpreted data elements,
    wherein the DFE module comprises:
        a plurality of delay elements operably coupled to delay the interpreted data elements to produce a plurality of delayed interpreted data elements;
        a plurality of gain stages, wherein at least one of the plurality of gain stages is operably coupled to apply gain to a corresponding one of the plurality of delayed interpreted data elements to produce the DFE data elements; and
        a delay element selector operably coupled to select one of the plurality of gain stages to produce the DFE data elements based on a channel response.

2. The high speed serial receiver of claim 1, wherein the decision module comprises:
    a limiting module operably coupled to limit the equalized serial stream of data to produce the interpreted data elements; and
    a clock and data recovery (CDR) module operably coupled to produce a recovered clock and recovered data based on the interpreted data elements.

3. The high speed serial receiver of claim 1, wherein the DFE module functions to selectively adjust gain of at least one of the plurality of gain stages based on a channel response.

4. The high speed serial receiver of claim 1, wherein each of the plurality of delay elements is operably coupled to receive a clock based on a recovered clock.

5. The high speed serial receiver of claim 1, wherein the linear equalizer comprises:
    a programmable equalizer operably coupled to equalize the serial stream of data at one of a plurality of equalization levels based on a channel response.

6. The high speed serial receiver of claim 5 wherein:
    the one of the plurality of equalization levels is based on at least one of the channel response and an inter-symbol interference (ISI) level; and
    gain of the at least one of the plurality of gain stages is based on at least one of the channel response and an inter-symbol interference (ISI) level.

7. The high speed serial receiver of claim 1 wherein the DFE module operates at a frequency of at least approximately 3 GHz.

8. A transmitter comprising:
    a pre-emphasis module operably coupled to pre-emphasize a serial stream of data to produce a pre-emphasized serial stream of data;
    a summing module operably coupled to sum at least one data element of the pre-emphasized serial stream of data with decision feedback pre-emphasis (DFP) data elements to produce pre-emphasized data elements;
    a line driver operably coupled to drive the pre-emphasized data elements on to a channel; and
    a decision feedback pre-emphasis (DFP) module operably coupled to produce the DFP data elements based on at least one of data elements of the serial stream of data and the pre-emphasized data elements,
    wherein the DFP module comprises:
        a plurality of delay elements operably coupled to delay the at least one of the data elements of the serial stream of data and the pre-emphasized data elements to produce delayed data elements;
        a plurality of gain stages, wherein at least one of the plurality of gain stages is operably coupled to apply gain to a corresponding one of the plurality of delayed data elements to produce the DFP data elements; and
        a delay element selector operably coupled to select one of the plurality of gain stages to produce the DFP data elements based on a channel response.

9. The transmitter of claim 8, wherein the DFP module functions to selectively adjust gain of at least one of the plurality of gain stages based on a channel response.

10. The transmitter of claim 8, wherein each of the plurality of delay elements is operably coupled to receive a clock based on a transmit clock.

11. The transmitter of claim 8, wherein the pre-emphasis module comprises:
    a programmable pre-emphasis module operably coupled to pre-emphasize the serial stream of data at one of a plurality of pre-emphasis levels based on a channel response.

12. The transmitter of claim 11 wherein:
    the one of the plurality of pre-emphasis levels is based on at least one of the channel response and an inter-symbol interference (ISI) level; and
    gain of the at least one of the plurality of gain stages is based on at least one of the channel response and an inter-symbol interference (ISI) level.

13. The transmitter of claim 8 wherein the DFP module operates at a frequency of at least approximately 3 GHz.

14. A communication system comprising:
- a communication channel operably coupled to transport transmitted serial data from a transmitter of a first data conveyance module to a receiver of a second data conveyance module;
- a pre-emphasis module of the transmitter, wherein the pre-emphasis module is operably coupled to pre-emphasize a serial stream of data to produce a pre-emphasized serial stream of data;
- a line driver of the transmitter, wherein the line driver is operably coupled to drive the pre-emphasized serial stream of data on to the communication channel as the transmitted serial data;
- a summing module of the receiver, wherein the summing module is operably coupled to sum at least one data element of the transmitted serial data with decision feedback equalization (DFE) data elements to produce equalized data elements;
- a decision module of the receiver, wherein the decision module is operably coupled to interpret the equalized data elements to produce interpreted data elements; and
- a decision feedback equalization (DFE) module of the receiver, wherein the DFE module is operably coupled to produce the DFE data elements from the interpreted data elements,
  - wherein the DFE module comprises:
    - a plurality of delay elements operably coupled to delay the interpreted data elements to produce a plurality of delayed interpreted data elements;
    - a plurality of gain stages, wherein at least one of the plurality of gain stages is operably coupled to apply gain to a corresponding one of the plurality of delayed interpreted data elements to produce the DFE data elements; and
    - a delay element selector operably coupled to select one of the plurality of gain stages to produce the DFE data elements based on a channel response.

15. The communication system of claim 14, wherein the decision module comprises:
- a limiting module operably coupled to limit the transmitted serial data to produce interpreted data elements; and
- a clock and data recovery (CDR) module operably coupled to produce a recovered clock and recovered data based on the interpreted data elements.

16. The communication system of claim 14, wherein the DFE module functions to selectively adjust gain of the at least one of the plurality of gain stages based on a channel response.

17. The communication system of claim 14, wherein each of the plurality of delay elements is operably coupled to receive a clock based on a recovered clock.

18. The communication system of claim 14, wherein the pre-emphasis module comprises:
- a programmable pre-emphasis module operably coupled to pre-emphasis the serial stream of data at one of a plurality of pre-emphasis levels based on a channel response.

19. The communication system of claim 18 wherein:
- the one of the plurality of pre-emphasis levels is based on at least one of the channel response and an inter-symbol interference (ISI) level; and
- gain of the at least one of the plurality of gain stages is based on at least one of the channel response and an inter-symbol interference (ISI) level.

20. The communication system of claim 14 wherein the DFE module operates at a frequency of at least approximately 3 GHz.

21. A communication system comprising:
- a communication channel operably coupled to transport transmitted serial data from a transmitter of a first data conveyance module to a receiver of a second data conveyance module;
- a summing module of the transmitter, wherein the summing module is operably coupled to sum at least one data element of serial data with decision feedback pre-emphasis (DFP) data elements to produce pre-emphasized data elements;
- a line driver of the transmitter, wherein the line driver is operably coupled to drive the pre-emphasized data elements on to the communication channel as the transmitted serial data;
- a decision feedback pre-emphasis (DFP) module of the transmitter, wherein the DFP module is operably coupled to produce the DFP data elements based on at least one of data elements of the serial data and the pre-emphasized data elements;
- a linear equalizer of the receiver, wherein the linear equalizer is operably coupled to equalize the transmitted serial data to produce equalized serial data; and
- a decision module operably coupled to interpret the equalized serial data to produce interpreted serial data,
  - wherein the DFP module comprises:
    - a plurality of delay elements operably coupled to delay the at least one of the data elements of the serial data and the pre-emphasized data elements to produce delayed data elements;
    - a plurality of gain stages, wherein at least one of the plurality of gain stages is operably coupled to apply gain to a corresponding one of the plurality of delayed data elements to produce the DFP data elements; and
    - a delay element selector operably coupled to select one of the plurality of gain stages to produce the DFP data elements based on a channel response.

22. The communication system of claim 21, wherein the DFP module functions to selectively adjust gain of at least one of the plurality of gain stages based on a channel response.

23. The communication system of claim 21, wherein each of the plurality of delay elements is operably coupled to receive a clock based on a transmit clock.

24. The communication system of claim 21, wherein the linear equalizer comprises:
- a programmable linear equalizer operably coupled to equalize the transmitted serial data at one of a plurality of equalization levels based on a channel response.

25. The communication system of claim 24 wherein:
- the one of the plurality of equalization levels is based on at least one of the channel response and an inter-symbol interference (ISI) level; and
- gain of the at least one of the plurality of gain stages is based on at least one of the channel response and an inter-symbol interference (ISI) level.

26. The communication system of claim 21 wherein the DFP module operates at a frequency of at least approximately 3 GHz.

* * * * *

UNITED STATES PATENT AND TRADEMARK OFFICE
CERTIFICATE OF CORRECTION

PATENT NO. : 7,599,431 B1 Page 1 of 1
APPLICATION NO. : 10/997159
DATED : October 6, 2009
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this

Twenty-eighth Day of September, 2010

David J. Kappos
*Director of the United States Patent and Trademark Office*